(12) United States Patent
Gitt

(10) Patent No.: US 7,987,741 B2
(45) Date of Patent: Aug. 2, 2011

(54) AUXILIARY RANGE TRANSMISSION

(75) Inventor: Carsten Gitt, Stuttgart (DE)

(73) Assignee: Daimler AG, Stuttgart (DE)

(*) Notice: Subject to any disclaimer, the term of this patent is extended or adjusted under 35 U.S.C. 154(b) by 307 days.

(21) Appl. No.: 12/378,489

(22) Filed: Feb. 13, 2009

(65) Prior Publication Data

US 2009/0235768 A1    Sep. 24, 2009

Related U.S. Application Data

(63) Continuation-in-part of application No. PCT/EP2007/007236, filed on Aug. 16, 2007.

(30) Foreign Application Priority Data

Aug. 16, 2006   (DE) .................. 10 2006 038 194

(51) Int. Cl.
*F16H 3/08* (2006.01)
(52) U.S. Cl. ........................................... 74/331
(58) Field of Classification Search ............... 74/325, 74/329, 331, 339; 475/207, 302, 208, 209
See application file for complete search history.

(56) References Cited

U.S. PATENT DOCUMENTS

| | | | |
|---|---|---|---|
| 4,152,949 A | | 5/1979 | Vanderwoort et al. |
| 4,269,077 A | | 5/1981 | Vanderwoort |
| 4,527,447 A | * | 7/1985 | Richards .................. 477/78 |
| 4,876,924 A | | 10/1989 | Fletcher et al. |
| 5,394,772 A | * | 3/1995 | Stine et al. .................. 74/745 |
| 5,398,563 A | * | 3/1995 | Stine .......................... 74/331 |
| 5,421,222 A | * | 6/1995 | Stine et al. .................. 74/745 |
| 5,447,082 A | | 9/1995 | Stine et al. |
| 6,257,082 B1 | | 7/2001 | Ore |
| 7,846,055 B2 | * | 12/2010 | Earhart .................. 475/207 |

* cited by examiner

*Primary Examiner* — David D Le
*Assistant Examiner* — David J Hlavka
(74) *Attorney, Agent, or Firm* — Klaus J. Bach

(57) ABSTRACT

In an auxiliary range transmission comprising a main group having a main transmission shaft and two main countershafts capable of rotating in relation to two auxiliary countershafts of a range or an auxiliary transmission group, a gearshift element is provided, which, in a first position, rotationally engages a loose gear of the main group and, in a second position, rotationally locks a loose gear of the range or auxiliary group with the main shaft. In an alternative embodiment, a splitter group may also be arranged in front of the main group in place of the range or auxiliary transmission group.

9 Claims, 3 Drawing Sheets

|     | S3 | | | S4 | | |
| --- | --- | --- | --- | --- | --- | --- |
|     | v3 | n3 | h3 | v4 | n4 | h4 |
| i1  |    | ○  |    | ●  |    |    |
| i2  |    |    | ●  |    | ○  |    |
| i3  |    | ○  |    |    |    | ●  |

Fig. 3

AUXILIARY RANGE TRANSMISSION

This is a Continuation-In-Part application of pending international patent application PCT/EP2007/007236 filed Aug. 16, 2007 and claiming the priority of German patent application 10 2006 038 194.7 filed Aug. 16, 2006.

BACKGROUND OF THE INVENTION

The invention relates to an auxiliary range transmission with two main countershafts and two auxiliary countershafts in a main and, respectively, an auxiliary transmission part.

U.S. Pat. No. 4,876,924 discloses an auxiliary range transmission, in which a main group and a range group are each provided with two independent countershafts. Three gearshift elements are provided in the main transmission. Two of these three gearshift elements are displaceable in both axial directions. The third gearshift element is displaceable in only one axial direction. Here the third gearshift element, in a merely schematic representation, is shown on the side facing the range group. In the detailed drawing associated with this schematic drawing, on the other hand, the third gearshift element is arranged on the side remote from the range group. Multiple spring-loaded clutches are further provided, which serve to couple loose gears of the range group to the associated main shaft.

U.S. Pat. No. 5,447,082 likewise discloses an auxiliary range transmission having a main group, a range group and parallel offset countershafts. The auxiliary range transmission here only has bilaterally acting gearshift elements. No gearshift element is provided between the loose gear of the main group and the loose gear of the range group U.S. Pat. No. 6,257,082 B1 likewise discloses an auxiliary range transmission having a main group, a range group and parallel offset countershafts. In this case a gearshift clutch is provided between the main group and the range group.

The main object of the invention is to provide a cost-effective auxiliary range transmission, which, in spite of being compact in construction, has a large number of gears.

SUMMARY OF THE INVENTION

In an auxiliary range transmission comprising a main group having two main countershafts capable of rotating in relation to two auxiliary countershafts of a range group, a gearshift element is provided, which, in a first position, rotationally locks a loose gear of the main group and, in a second position, rotationally locks a loose gear of the range group to a main shaft, wherein, in an alternative embodiment, a splitter group may also be arranged in front of the main group in place of the range group.

A single gearshift clutch can advantageously be used to shift both a loose gear of the main group and alternatively a loose gear of the auxiliary shift group. This auxiliary shift group may, in particular, be a range group on the output side of the main group. Alternatively or in addition, however, the auxiliary shift group may also be a splitter group arranged axially in front of the main group.

The auxiliary shaft range may provide three different transmission ratios, so that the total number of gears of the auxiliary range transmission is obtained as the number of gears in the main group multiplied by the number of gears in the auxiliary shift group.

The auxiliary shift group may in particular have two gearshift elements for providing the three transmission ratios. Each of these two gearshift elements can be brought into two positions. These positions may take the form of limit positions, a central neutral position being provided between these positions.

Use of the gear in the main group, which is actuated by the gearshift element also assigned to the auxiliary shift group, is forcibly prevented in those transmission states of the auxiliary shift group in which the loose gear of the adjacent gearwheel plane of the auxiliary shift group lies in the transmission path. For this reason it is particularly advantageous if a gearwheel plane of the main group, which is not necessarily needed in all shift states of the auxiliary shift group, can be arranged adjacent to the range group.

The invention will become more readily apparent from the following description of exemplary embodiments thereof with reference to the accompanying drawings:

DESCRIPTION OF EXEMPLARY EMBODIMENTS

Figure 1:
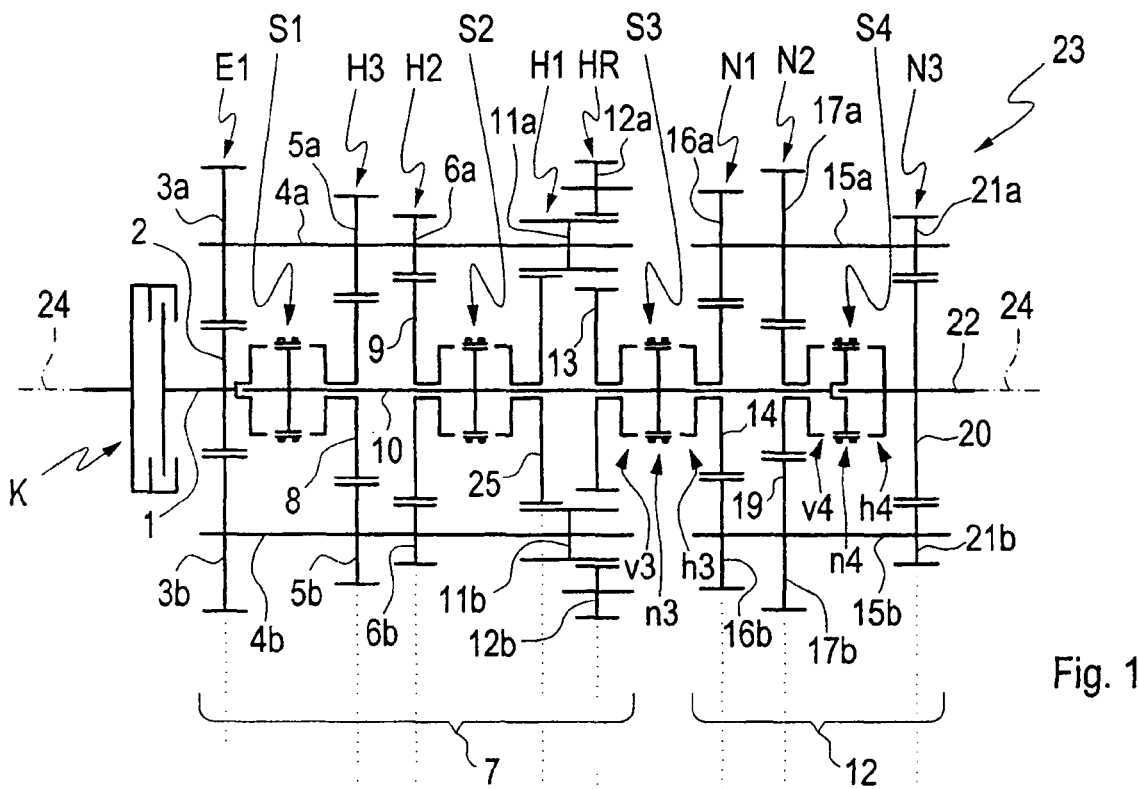
FIG. 1. shows a first embodiment of an auxiliary range transmission having a range group and gearshift elements, FIG. 2. shows the transmission paths in the gears of the auxiliary range transmission according to FIG. 1, FIG. 3. shows a table with the positions of the gearshift elements according to FIG. 1 for providing three transmission ratios in the range group, FIG. 4. shows a second embodiment of an auxiliary range transmission having a range group and gearshift elements, and FIG. 5. shows the transmission paths in the gears of the auxiliary range transmission according to FIG. 4

FIG. 1 shows a first embodiment of an auxiliary range transmission 23 having a range group and gearshift elements. This auxiliary range transmission 23 is used in a commercial vehicle.

This auxiliary range transmission 23 comprises a constant input E1, a main group 7 and a range group 12. This range group 12 comprises three gearwheel planes N1, N2, N3 and two gearshift elements S3, S4. According to FIG. 3 these two gearshift elements S3, S4 can be used to obtain three different transmission ratios i1, i2, i3 in the range group 12.

Next to the engine crankshaft (not represented in further detail) in the power transmission path is a drive-away clutch K, which is followed by the auxiliary range transmission 23.

The engine can be frictionally coupled by means of the drive-away clutch K to a transmission input shaft 1. This transmission input shaft 1 has a fixed gear 2, which meshes with two fixed gears 3a, 3b, which are arranged diametrically opposite one another about a main axis 24 and are in each case arranged at the front end of two main countershafts 4a, 4b. These two fixed gears 3a, 3b together with the aforementioned fixed gear 2 therefore form a constant input E1. Their fixed gears 3a, 3b are each succeeded by two further fixed gears 5a, 6a, 5b, 6b of diminishing diameter. Two gearwheel planes H3, H2 of the main group 7 are assigned to the latter fixed gears 5a, 6a, 5b, 6b. Only forward gears are assigned to these two gearwheel planes H3, H2. For this purpose the two fixed gears 5a, 6a, 5b, 6b of these two gearwheel planes H3, H2 mesh with loose gears 8, 9, which are arranged coaxially so that they can rotate about a main shaft 10. The front end of the main shaft 10 is here supported in a blind hole in the rear end of the transmission input shaft 1.

A first gearshift element S1, which in a forward position serves to rotationally lock the transmission input shaft 1 to the main shaft 10, so that a direct through-drive is established to the range group 12, is arranged between the fixed gear 2 on the transmission input shaft 1 and the foremost loose gear 8 on the main shaft 10. In a rear position the foremost loose gear 8 on the main shaft 10 can be rotationally locked to the latter. The neutral position of the first gearshift element S1 lies between the forward position and the rear position.

Situated behind each of the two small fixed gears 6a, 6b on the front main countershafts 4a, 4b is a fixed gear 11a and 11b respectively, which is of smaller diameter but wider. These wide fixed gears 11a, 11b mesh with a loose gear 25, which is rotatably arranged coaxially with the main shaft 10. A gearwheel plane H1, which among other things is assigned to the first forward gear I, is thereby formed. These other fixed gears 11a, 11b furthermore each mesh by way of an intermediate gear 12a, 12b with a loose gear 13 on the main shaft 10, so that a gearwheel plane HR is formed by two reverse gears R1 and R2. A second gearshift element S2 is arranged coaxially on the main shaft 10 between the gearwheel plane H1 of the first forward gear I and the gearwheel plane H2 of a second forward gear II situated in front of it. The loose gear 9 or the loose gear 25 can therefore alternatively be coupled to the main shaft 10 by means of the second gearshift element S2. A neutral position of the second gearshift element S2 is situated between the relative positions of the second gearshift element S2.

The main shaft 10 continues partially in the succeeding range group 12. Thus at the front end of the range group 12 a loose gear 14 is coaxially supported so that it can rotate on the main shaft 10. This loose gear 14 meshes with two medium-sized fixed gears 16a, 16b, which are each arranged, rotationally fixed, on one of two rear auxiliary countershafts 15a, 15b. These two auxiliary countershafts 15a, 15b are arranged diametrically opposite one another about the main axis 24. The loose gear 14 with the two medium-sized fixed gears 16a, 16b here forms the foremost and first gearwheel plane N1 of the range group 12. The fixed gears 16a, 16b are followed on the auxiliary countershafts 15a, 15b by large fixed gears 17a, 17b. These fixed gears 17a, 17b mesh with a loose gear 19, which is again arranged coaxially so that it can rotate on the mains shaft 10. The loose gear 19 with the two large fixed gears 17a, 17b therefore forms the second gearwheel plane N2 of the range group 12.

The foremost loose gear 14 of the range group 12 can be rotationally locked to the main shaft 10 by means of the third gearshift element S3 shifted into a rear position h3. This third gearshift element S3 is on the other hand shifted into the forward position v3 in order to couple the rearmost loose gear 13 of the main group 7 to the main shaft 10.

Behind the second gearwheel plane N2 of the range group 12 the transmission output shaft 22 is arranged in alignment with the main shaft 10. This transmission output shaft 22 is rotationally locked to a fixed gear 20, which meshes with two fixed gears 21a, 21b, which are each rotationally locked to one of the two auxiliary countershafts 15a, 15b. The three rearmost fixed gears 20, 21a, 21b thereby form the third gearwheel plane N3 of the range group 12.

The transmission output shaft 22 can be rotationally locked to the main shaft 10 by means of the fourth gearshift element S4 shifted into a rear position h4. If the fourth gearshift element S4 is shifted into the forward position v4, on the other hand, it establishes a rotationally fixed connection between the loose gear 19 situated in front and the main shaft 10. Like the first two gearshift elements S1, S2, the third and the fourth gearshift elements S3, S4 also each have a middle neutral position n3 and n4 respectively.

It is thereby impossible for the loose gears 13, 14 in the gearwheel plane HR of the reverse gear and the first gearwheel plane of the range group to be rotationally locked to the main shaft 10 simultaneously, since both gearwheels 13, 14 are actuated by means of the same, that is to say the third sliding sleeve S3. The middle transmission ratio i2 assigned to the first gearwheel plane N1 of the range group cannot therefore be combined with the reverse gear. The size ratios of the gearwheels in the range group 12 do not allow their first gearwheel plane N1 to be involved in forming the highest—that is to say the shortest—transmission ratio i3. This affords a quick reverse gear, which is important in drive-off and tight maneuvering operations.

Figure 2:
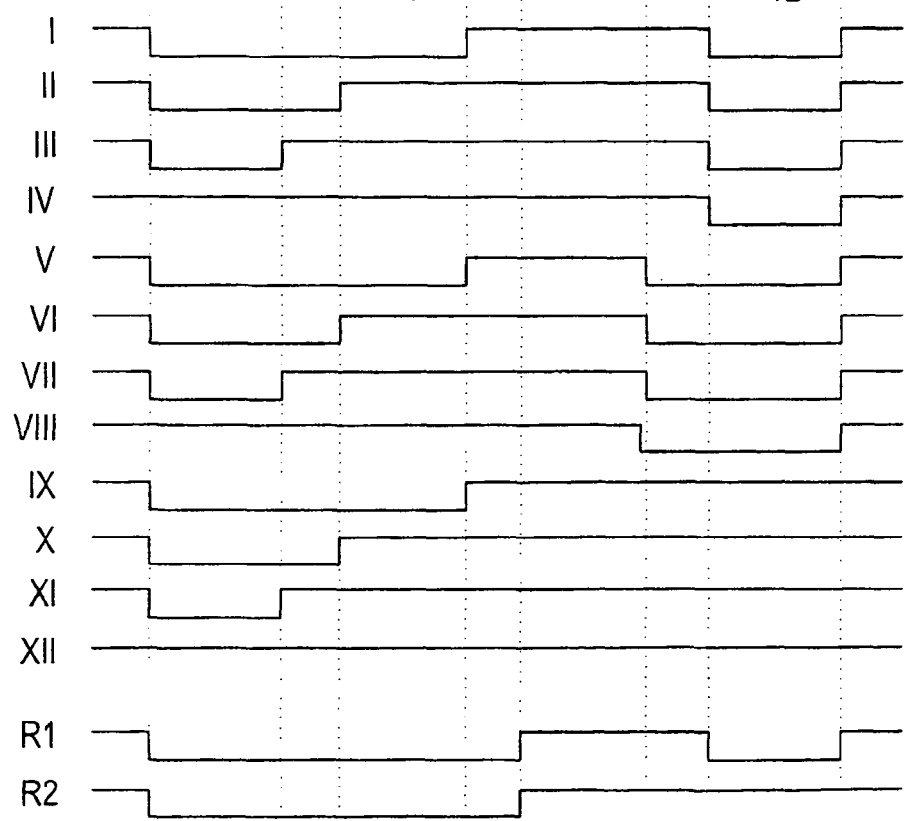
Figure 3:
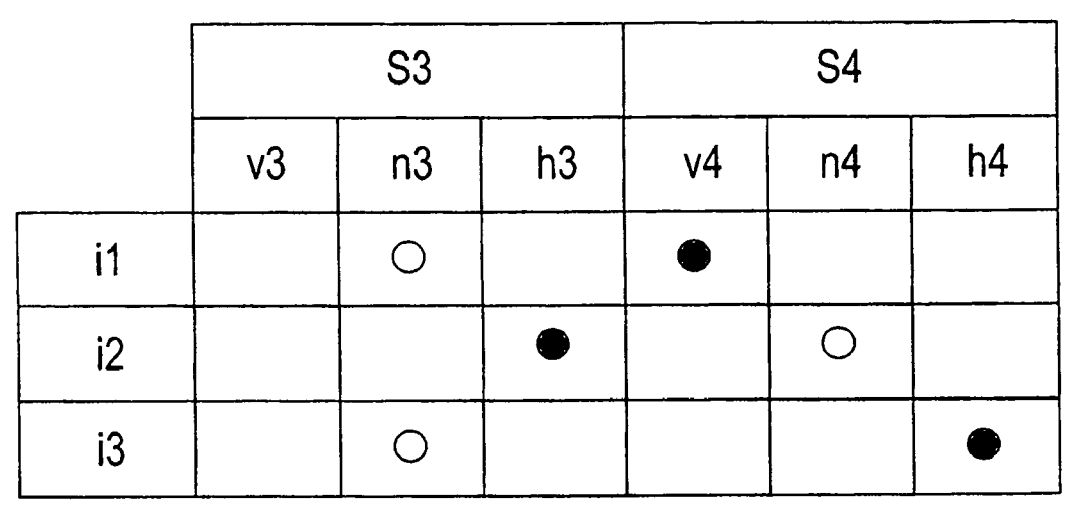

FIG. 2 shows the transmission path in the auxiliary range transmission 23 according to FIG. 1, whilst FIG. 3 relating to the range group 12 shows the possible shift positions v3, n3, h3 of the third gearshift element S3 and the possible shift positions v4, n4, h4 of the fourth gearshift element S4. Here this auxiliary range transmission 23 is designed in such a way that the range group 12 has four range areas, so that a total of twelve forward gears I to XII and two reverse gears R1 and R2 are formed.

In the first forward gear I
the first gearshift element S1 is in the neutral position,
the second gearshift element S2 is in the rear position,
the third gearshift element S3 is in the neutral position n3 and
the fourth gearshift element S4 is in the forward position v4.

The power transmission path runs via the constant input E1, the first gearwheel plane H1, and in the range group via the second gearwheel plane N2 and the third gearwheel plane N3.

In the second forward gear II
the first gearshift element S1 is in the neutral position,
the second gearshift element S2 is in the forward position,
the third gearshift element S3 is in the neutral position n3 and
the fourth gearshift element S4 is in the forward position v4.

The power transmission path runs via the constant input E1, the second gearwheel plane H2, and in the range group via the second gearwheel plane N2 and the third gearwheel plane N3.

In the third forward gear III
the first gearshift element S1 is in the rear position,
the second gearshift element S2 is in the neutral position,
the third gearshift element S3 is in the neutral position n3 and
the fourth gearshift element S4 is in the forward position v4.

The power transmission path runs via the constant input E1, the third gearwheel plane H3, and in the range group via the second gearwheel plane N2 and the third gearwheel plane N3.

In the fourth forward gear IV
the first gearshift element S1 is in the forward position,
the second gearshift element S2 is in the neutral position,
the third gearshift element S3 is in the neutral position n3 and
the fourth gearshift element S4 is in the forward position v4.

The power transmission path runs directly via the main shaft 10, and in the range group via the second gearwheel plane N2 and the third gearwheel plane N3.

In the fifth forward gear V
the first gearshift element S1 is in the neutral position,
the second gearshift element S2 is in the rear position,
the third gearshift element S3 is in the rear position h3 and the fourth gearshift element S4 is in the neutral position n4.
The power transmission path runs via the constant input E1, the first gearwheel plane H1, and in the range group via the first gearwheel plane N1 and the third gearwheel plane N3.

In the sixth forward gear VI
   the first gearshift element S1 is in the neutral position,
   the second gearshift element S2 is in the forward position,
   the third gearshift element S3 is in the rear position h3 and
   the fourth gearshift element S4 is in the neutral position n4.
   The power transmission path runs via the constant input E1, the second gearwheel plane H2, and in the range group via the first gearwheel plane N1 and the third gearwheel plane N3.

In the seventh forward gear VII
   the first gearshift element S1 is in the rear position,
   the second gearshift element S2 is in the neutral position,
   the third gearshift element S3 is in the rear position h3 and
   the fourth gearshift element S4 is in the neutral position n4.
   The power transmission path runs via the constant input E1, the third gearwheel plane H3, and in the range group via the first gearwheel plane N1 and the third gearwheel plane N3.

In the eighth forward gear VIII
   the first gearshift element S1 is in the forward position,
   the second gearshift element S2 is in the neutral position,
   the third gearshift element S3 is in the rear position h3 and
   the fourth gearshift element S4 is in the neutral position n4.
The power transmission path runs directly via the main shaft 10, and in the range group via the first gearwheel plane N1 and the third gearwheel plane N3.

In the ninth forward gear IX
   the first gearshift element S1 is in the neutral position,
   the second gearshift element S2 is in the rear position,
   the third gearshift element S3 is in the neutral position n3 and
   the fourth gearshift element S4 is in the rear position h4.
The power transmission path runs via the constant input E1, the first gearwheel plane H1 and directly from the main shaft 10 to the transmission output shaft 22.

In the tenth forward gear X
   the first gearshift element S1 is in the neutral position,
   the second gearshift element S2 is in the forward position,
   the third gearshift element S3 is in the neutral position n3 and
   the fourth gearshift element S4 is in the rear position h4.
The power transmission path runs via the constant input E1, the second gearwheel plane H2 and directly from the main shaft 10 to the transmission output shaft 22.

In the eleventh forward gear XI
   the first gearshift element S1 is in the rear position,
   the second gearshift element S2 is in the neutral position,
   the third gearshift element S3 is in the neutral position n3 and
   the fourth gearshift element S4 is in the rear position h4.
The power transmission path runs via the constant input E1, the third gearwheel plane H3 and directly from the main shaft 10 to the transmission output shaft 22.

In the twelfth forward gear XII
   the first gearshift element S1 is in the forward position,
   the second gearshift element S2 is in the neutral position,
   the third gearshift element S3 is in the neutral position n3 and
   the fourth gearshift element S4 is in the rear position h4.
Accordingly in this twelfth forward gear XII both the main group 7 and the range group 12 are connected to direct through-drive, so that in the auxiliary range transmission 23 the direct gear is engaged.

In the first reverse gear R1
   the first gearshift element S1 is in the neutral position,
   the second gearshift element S2 is in the neutral position,
   the third gearshift element S3 is in the forward position v3 and
   the fourth gearshift element S4 is in the forward position v4.
The power transmission path runs via the constant input E1, the second gearwheel plane HR of the reverse gear, and in the range group via the second gearwheel plane N2 and the third gearwheel plane N3.

In the second reverse gear R2
   the first gearshift element S1 is in the neutral position,
   the second gearshift element S2 is in the rear position,
   the third gearshift element S3 is in the forward position v3 and
   the fourth gearshift element S4 is in the rear position h4.
The power transmission path runs via the constant input E1, the second gearwheel plane HR of the reverse gear directly to the transmission output shaft 22.

Here one of the three transmission ratios i1 to i3 is the direct through-drive. The auxiliary range transmission is preferably designed in such a way that the direct through-drive represents the highest, that is to say the fastest transmission ratio i3. Alternative configurations are also feasible, however. Thus the auxiliary range transmission 23 can in principle be configured in three different ways:
   a) embodiment with three different transmission ranges, that is range groups
   b) embodiment with three split transmissions, which is not represented in the drawing here, and
   c) embodiment with two split transmissions and one range transmission, which may be the direct through-drive, for example.

Figure 4:
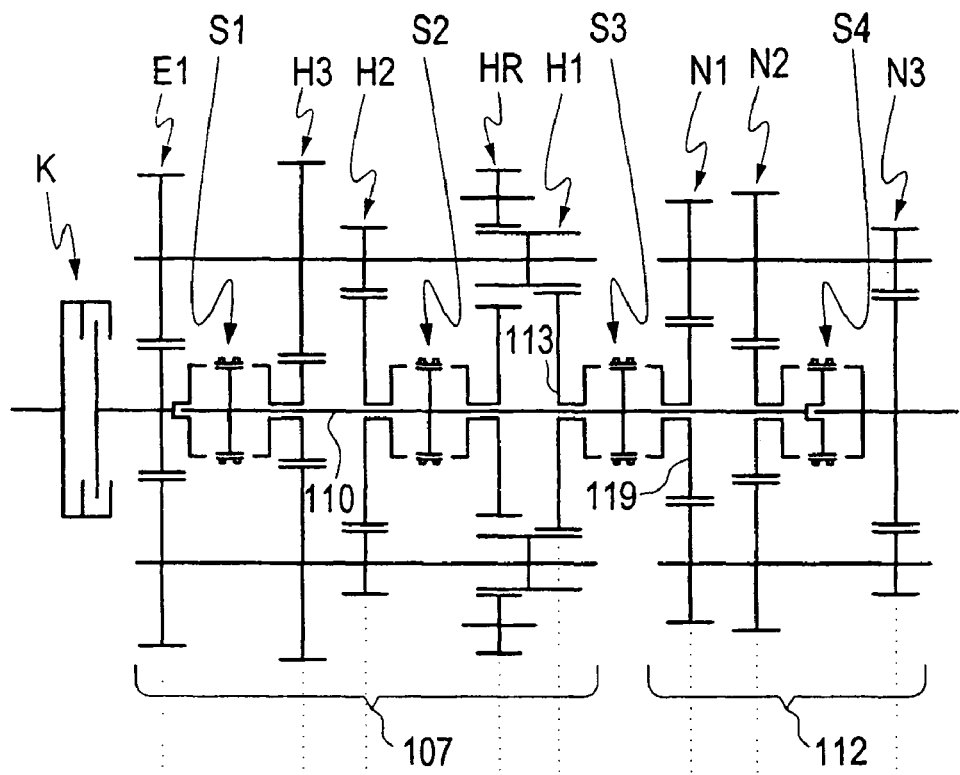
Figure 5:
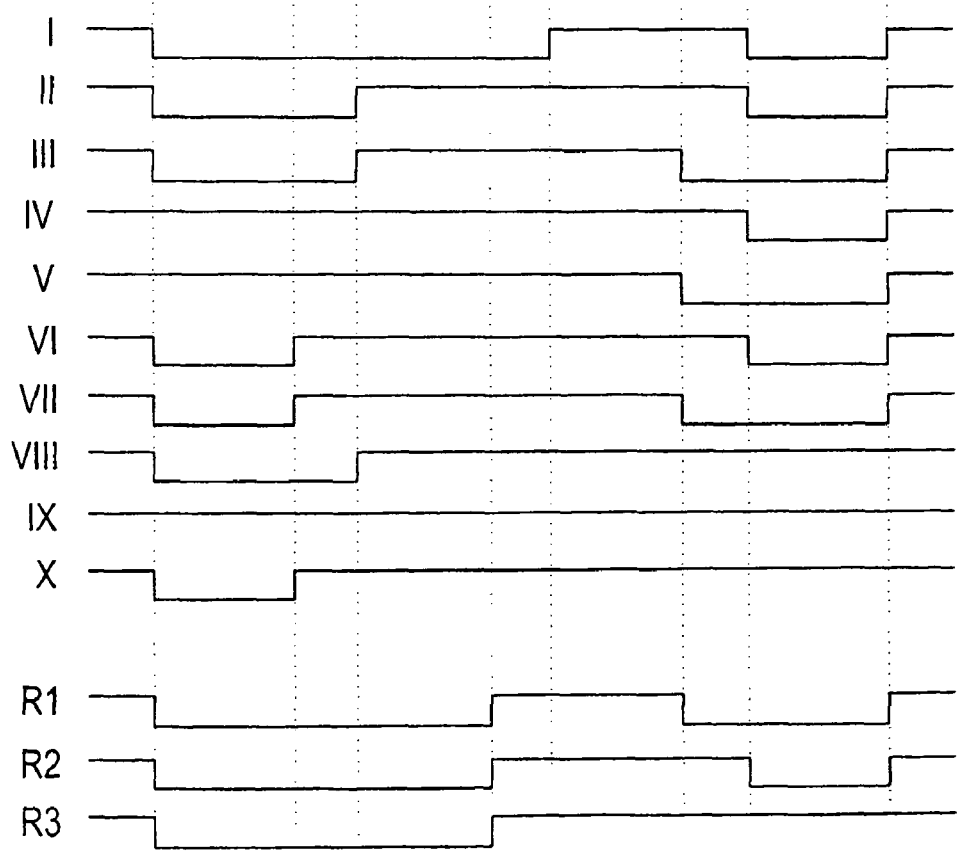

Whilst the configuration a) is represented in FIG. 1 to FIG. 2, the configuration 3) is represented in FIG. 4 and FIG. 5 below.

It can be seen from this that instead of the gearwheel plane HR of the reverse gear, one of the gearwheel planes H1 to H3 may also be arranged at the rearmost point of the main group 107, so that its loose gear 113 can be coupled to the main shaft 110 by means of the third gearshift element S3. Such a configuration lends itself, in particular, to a crawler gear combined with the third gearshift element S3, which can then be used only in combination with the shortest transmission ratio i3.

According to FIG. 4 the first gearwheel plane H1 and the gearwheel plane HR of the reverse gear are transposed compared to the preceding exemplary embodiment. The transmission ratios are furthermore somewhat modified in practice. Instead of the gearwheel plane HR of the reverse gear, therefore, the first gearwheel plane H1 of a forward gear is adjacent to the range group 112. This first gearwheel plane H1 of the forward gear has the highest transmission ratio—that is to say the shortest transmission—so that this first gearwheel plane H1 forms a crawler gear I. Here this crawler gear I is engaged by the gearshift element S3, which is also assigned to the foremost loose gear 119 of the range group 112. The range group 112 is used to form two split transmissions and one range transmission.

In the crawler gear I
   the first gearshift element S1 is in the neutral position,
   the second gearshift element S2 is in the neutral position,
   the third gearshift element S3 is in the forward position and
   the fourth gearshift element S4 is in the rear position.
The power transmission path runs via the constant input E1, the first gearwheel plane H1, and in the range group via the second gearwheel plane N2 and the third gearwheel plane N3.

In the second forward gear II
  the first gearshift element S1 is in the neutral position,
  the second gearshift element S2 is in the forward position,
  the third gearshift element S3 is in the neutral position and
  the fourth gearshift element S4 is in the forward position.
The power transmission path runs via the constant input E1, the second gearwheel plane H2, and in the range group via the second gearwheel plane N2 and the third gearwheel plane N3.
  In the third forward gear III
  the first gearshift element S1 is in the neutral position,
  the second gearshift element S2 is in the forward position,
  the third gearshift element S3 is in the rear position and
  the fourth gearshift element S4 is in the neutral position.
The power transmission path runs via the constant input E1, the second gearwheel plane H2, and in the range group via the first gearwheel plane N1 and the third gearwheel plane N3.
  In the fourth forward gear IV
  the first gearshift element S1 is in the forward position,
  the second gearshift element S2 is in the neutral position,
  the third gearshift element S3 is in the neutral position and
  the fourth gearshift element S4 is in the forward position.
The power transmission path runs directly to the range group and thence via the second gearwheel plane N2 and the third gearwheel plane N3.
  In the fifth forward gear V
  the first gearshift element S1 is in the forward position,
  the second gearshift element S2 is in the neutral position,
  the third gearshift element S3 is in the rear position and
  the fourth gearshift element S4 is in the neutral position.
The power transmission path runs directly to the range group and thence via the first gearwheel plane N1 and the third gearwheel plane N3.
  In the sixth forward gear VI
  the first gearshift element S1 is in the rear position,
  the second gearshift element S2 is in the neutral position,
  the third gearshift element S3 is in the neutral position and
  the fourth gearshift element S4 is in the forward position.
The power transmission path runs via the constant input E1, the third gearwheel plane H3, and in the range group via the second gearwheel plane N2 and the third gearwheel plane N3.
  In the seventh forward gear VII
  the first gearshift element S1 is in the rear position,
  the second gearshift element S2 is in the neutral position,
  the third gearshift element S3 is in the rear position and
  the fourth gearshift element S4 is in the neutral position.
The power transmission path runs via the constant input E1, the third gearwheel plane H3, and in the range group via the first gearwheel plane N1 and the third gearwheel plane N3.
  In the eighth forward gear VIII
  the first gearshift element S1 is in the neutral position,
  the second gearshift element S2 is in the forward position,
  the third gearshift element S3 is in the neutral position and
  the fourth gearshift element S4 is in the rear position.
The power transmission path runs via the constant input E1, the second gearwheel plane H2 and directly from the main shaft 110 to the transmission output shaft.
  In the ninth forward gear IX
  the first gearshift element S1 is in the forward position,
  the second gearshift element S2 is in the neutral position,
  the third gearshift element S3 is in the neutral position and
  the fourth gearshift element S4 is in the rear position.
Accordingly in this ninth forward gear IX both the main group 107 and the range group 112 are connected to direct through-drive, so that in the auxiliary range transmission the direct gear is engaged.
  In the tenth forward gear X
  the first gearshift element S1 is in the rear position,
  the second gearshift element S2 is in the neutral position,
  the third gearshift element S3 is in the neutral position and
  the fourth gearshift element S4 is in the rear position.
The power transmission path runs via the constant input E1, the third gearwheel plane H3, and directly from the main shaft 110 to the transmission output shaft.

Since in this exemplary embodiment the gearwheel plane HR of the reverse gear is connected to the second gearshift element S2—rather than the third gearshift element S3—there are, in contrast to the first exemplary embodiment, three available reverse gears R1 to R3.
  In the first reverse gear R1
  the first gearshift element S1 is in the neutral position,
  the second gearshift element S2 is in the rear position,
  the third gearshift element S3 is in the rear position and
  the fourth gearshift element S4 is in the neutral position.
The transmission path runs via the constant input E1, the second gearwheel plane HR of the reverse gear, and in the range group via the first gearwheel plane N1 and the third gearwheel plane N3.
  In the second reverse gear R2
  the first gearshift element S1 is in the neutral position,
  the second gearshift element S2 is in the neutral position,
  the third gearshift element S3 is in the forward position and
  the fourth gearshift element S4 is in the forward position.
The power transmission path runs via the constant input E1, the second gearwheel plane HR of the reverse gear, and in the range group via the second gearwheel plane N2 and the third gearwheel plane N3.
  In the third reverse gear R3
  the first gearshift element S1 is in the neutral position,
  the second gearshift element S2 is in the neutral position,
  the third gearshift element S3 is in the neutral position and
  the fourth gearshift element S4 is in the rear position.
The power transmission path runs via the constant input E1, the second gearwheel plane HR of the reverse gear directly to the transmission output shaft 22.

Instead of two main countershafts, it is also possible to provide three main countershafts. Alternatively or in addition it is also possible to provide three auxiliary countershafts instead of two auxiliary countershafts. The auxiliary countershafts and/or main countershafts may in particular be uniformly distributed around the periphery.

The embodiments described are only examples of configurations. It is also possible to combine the features described for different embodiments of the auxiliary range transmission. Further features, and in particular features not described, of the transmission parts pertaining to the invention are to be inferred from the gearwheel size ratios, that is to say in particular the transmission ratios, represented in the drawings.

What is claimed is:

1. An auxiliary range transmission comprising a main group (7) having a main transmission shaft (10) and two main countershafts (4a, 4b), which are capable of rotating in relation to two auxiliary countershafts (15a, 15b), which form part of an auxiliary transmission group (12), said auxiliary range transmission including a gearshift element (S3), which is arranged on the main transmission shaft (10) and which
  in a first position (v3) rotationally engages a loose gear (13) of the main group (7) arranged on the main transmission shaft (10) and
  in a second position (h3) rotationally engages a loose gear (14) of belonging to the auxiliary shift group (12) and being also arranged on the main transmission shaft (10) with the main transmission shaft (10).

2. The auxiliary range transmission as claimed in claim 1, wherein the gearshift element (S3) has a neutral position (n3).

3. The auxiliary range transmission as claimed in claim 1, wherein the loose gear (13) of the main group (7) is assigned to a reverse gear.

4. The auxiliary range transmission as claimed in claim 1, wherein the loose gear (113) of the main group (107) is assigned to a forward gear (I).

5. The auxiliary range transmission as claimed in claim 4, wherein the main group (107) provides for ten forward gears (I to X) and the first forward gear (I) has the highest transmission ratio of all forward gears (I to X) of the main group (107).

6. The auxiliary range transmission as claimed in claim 1, wherein the auxiliary transmission shift group (12) provides three different transmission ratios (i1, i2, i3), of which a one transmission ratio (i3) is a direct through-drive.

7. The auxiliary range transmission as claimed in claim 6, wherein a second transmission ratio (i2) of the auxiliary shift group (12) is in transmission ratio magnitude situated between the first transmission ratio (i1) and the third transmission ratio (i3), the loose gear (14) of the auxiliary shift group (12) lying in the transmission path of this second transmission ratio (i2).

8. The auxiliary range transmission as claimed in claim 1, wherein the auxiliary shift group (12) is embodied as a range group arranged axially behind the main group (7).

9. The auxiliary range transmission as claimed in claim 1, wherein the auxiliary shift group is embodied as a split group arranged axially in front of the main group.

* * * * *